United States Patent [19]

Himmler

[11] 4,047,088
[45] Sept. 6, 1977

[54] DUAL VOLTAGE CHARGING SYSTEM

[75] Inventor: Dennis W. Himmler, Clawson, Mich.

[73] Assignee: General Motors Corporation, Detroit, Mich.

[21] Appl. No.: 694,158

[22] Filed: June 9, 1976

[51] Int. Cl.² .............................................. H02J 7/14
[52] U.S. Cl. ........................................ 320/6; 320/17; 320/39; 322/90
[58] Field of Search .................... 320/6, 15, 16, 17, 39, 320/40; 322/89, 90, 94

[56] References Cited

U.S. PATENT DOCUMENTS

| | | | |
|---|---|---|---|
| 3,011,115 | 11/1961 | Grady, Jr. ................................ | 320/64 |
| 3,624,480 | 11/1971 | Campbell et al. ...................... | 320/15 |
| 3,667,025 | 5/1972 | Campbell et al. ...................... | 320/15 |
| 3,671,843 | 6/1972 | Huntzinger et al. ................... | 320/15 |
| 3,710,226 | 1/1973 | Seike ...................................... | 320/15 |
| 3,809,995 | 5/1974 | Hardin ............................... | 320/16 X |
| 3,836,788 | 9/1974 | Carlson et al. ......................... | 290/50 |
| 3,900,784 | 8/1975 | Seike ...................................... | 320/17 X |
| 3,922,592 | 11/1975 | Quantz .................................... | 320/15 |

Primary Examiner—Robert J. Hickey
Attorney, Agent, or Firm—C. R. Meland

[57] ABSTRACT

A motor vehicle electrical system which is capable of supplying both 12 and 24 volt loads. A pair of 12 volt batteries are permanently connected in series and are charged in series under certain conditions of operation from a 24 volt charging system including an alternating current generator and a bridge rectifier. The output voltage of the 24 volt charging system is maintained substantially constant by a voltage regulator connected with the field of the generator which senses and responds to the output voltage of the bridge rectifier that is applied to the series connected batteries and other 24 volt loads. An auxiliary charging circuit is provided connected between one of the phase windings of the generator and the junction of the series connected batteries for, at times, supplying current to one of the batteries that supplies the 12 volt loads. This circuit includes a series connected silicon controlled rectifier and inductance. The controlled rectifier is gated into conduction whenever the voltage at the junction of the two batteries drops below a voltage corresponding substantially to one-half of the output voltage of the bridge rectifier that feeds the 24 volt loads.

3 Claims, 1 Drawing Figure

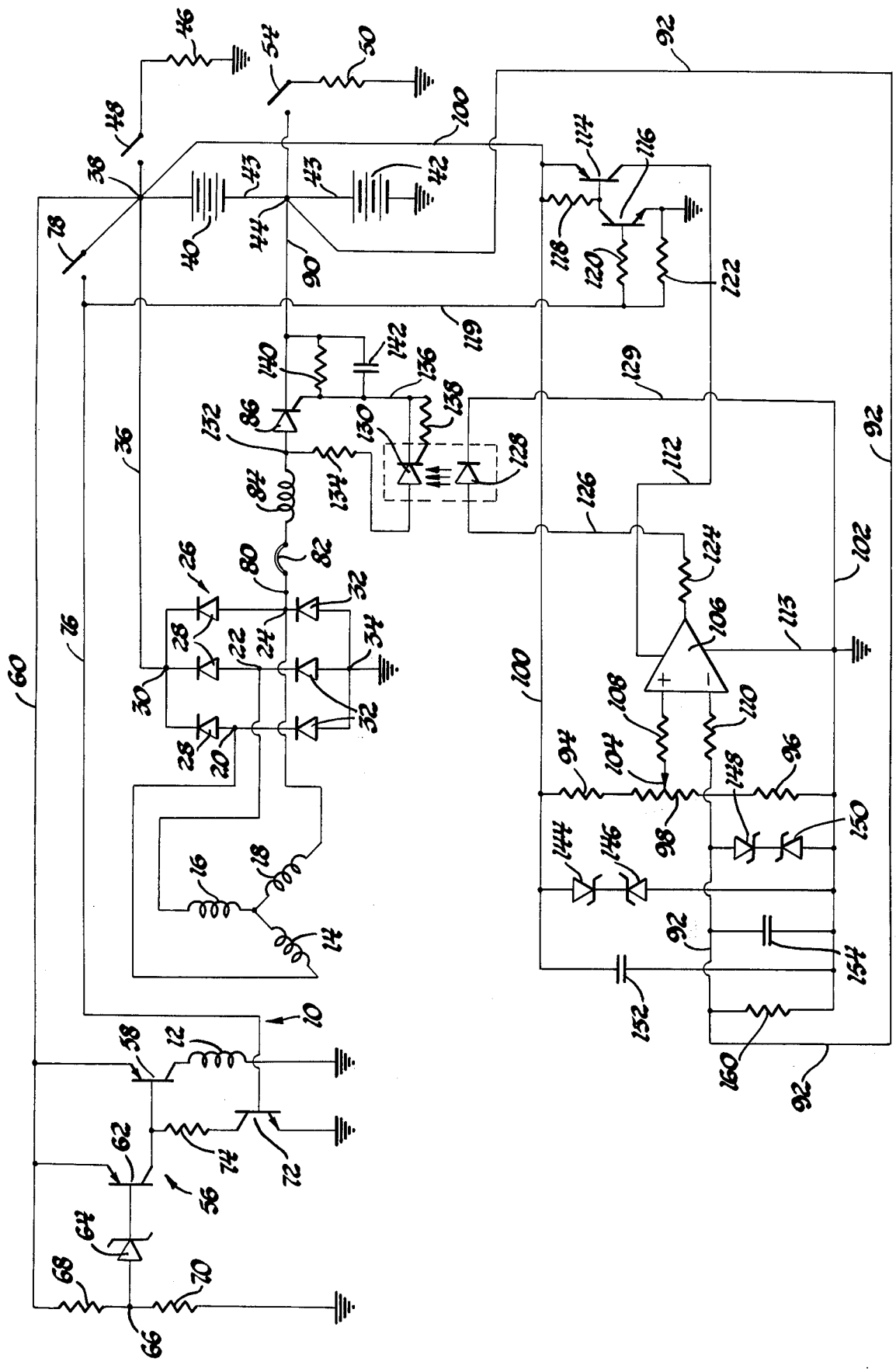

DUAL VOLTAGE CHARGING SYSTEM

This invention relates to motor vehicle electrical systems and more particularly to a motor vehicle electrical system that is capable of supplying both 12 volt and 24 volt loads.

Motor vehicle electrical systems have one or more batteries and an engine driven generator for supplying charging current to the batteries and to the electrical loads on the vehicle. In some type of electrical systems, for example motor coach and truck applications, it is desirable to have a system that can supply both 12 volt and 24 volt loads. Examples of 24 volt loads are the electric cranking motor for cranking the engine and various 24 volt direct current blower motors. Examples of 12 volt loads are the outside lighting system for the vehicle such as head lamps and 12 volt communication equipment.

One known arrangement for supplying 12 and 24 volt loads is to connect two 12 volt batteries in series across the output of a generating system which is regulated to provide the required voltage for charging the two series-connected batteries. In this system the output of the generator system may be regulated, for example at 27.5 volts, and the two series-connected batteries are connected directly across this charging source. In this type of system the 24 volt loads are connected across the two series-connected batteries while the 12 volt loads are connected across one of the 12 volt batteries.

With the type of system that has just been described it is difficult to equalize the loads on the 24 volt and 12 volt systems with the result that battery over-charging or under-charging may occur. One solution to this problem is described in the U.S. Pat. to Campbell et al., No. 3,667,025, granted on May 30, 1972. In this patent two series connected 12 volt batteries are charged in series by a 24 volt charging system. The voltage at the junction of the two batteries is compared with substantially one-half the output voltage of the 24 volt charging system and when the voltage between the batteries drops to a predetermined value one of the 12 volt batteries is charged from an additional charging circuit. This additional charging circuit has a direct voltage input from the other battery and comprises a multivibrator, transformer and rectifier for charging the battery.

Another patent which described charging systems for dual battery arrangement is the U.S. Pat. to Campbell et al., No. 3,624,480, granted on Nov. 30, 1971. This patent describes a system in which two series connected batteries are charged from a bridge rectifier circuit that is supplied by an alternating current generator. In this patent a plurality of controlled rectifiers are connected between the phase windings of the alternator and the junction of the two batteries. In this patent the output voltage of the alternator is regulated at a voltage sufficient to charge one of the two batteries and the voltage across the other battery is sensed. When the voltage across the other battery is such as to indicate a full charge the controlled rectifiers are gated conductive.

The present invention is an improvement over the battery charging systems described in the above-mentioned patents. Thus, the present invention contemplates providing a simple and inexpensive arrangement for maintaining equal charge on two series connected 12 volt batteries in a 12–24 volt system. This is accomplished by providing an auxiliary charging circuit for one of the 12 volt batteries that includes a single controlled rectifier connected between one of the phase windings of the generator and the junction of the two batteries. The controlled rectifier is gated conductive whenever the voltage at the junction between batteries drops below substantially one-half the voltage applied to the 24 volt loads. This auxiliary charging circuit includes an inductance which serves to limit current flow to the 12 volt system and which also serves to minimize sudden load changes on the alternator phase windings when the battery of the 12 volt system is to be charged.

It accordingly is one of the objects of this invention to provide a simple and inexpensive battery charging system for a 12–24 volt system which includes a controlled rectifier and a series connected inductance connected between one phase winding of the generator and the junction of the two batteries.

Another object of this invention is to provide a 12–24 motor vehicle electrical system in which a controlled rectifier is connected between an alternator phase winding and a junction of the two 12 volt batteries and where the controlled rectifier is, at times, gated into conduction by a control circuit that includes optical coupling between the control circuit and the device for gating the controlled rectifier conductive. In carrying this object forward the gate of the controlled rectifier is connected to an optically gated controlled rectifier which is optically coupled to a light emitting diode. The light emitting diode is energized by the output of an operational amplifier which operates as a voltage comparator that has its input terminals connected to respond to the difference in voltage between one-half system voltage and the voltage of the junction of the two 12 volt batteries. Since optical coupling is utilized the power and control circuits of the system are electrically isolated to prevent feedback to the input of the operational amplifier.

IN THE DRAWINGS

The single FIGURE drawing is a schematic circuit diagram of a motor vehicle electrical system made in accordance with this invention.

Referring now to the drawing, the reference number 10 generally designates an alternating current generator which has a field winding 12 and a three-phase Y-connected output winding comprised of phase windings 14, 16 and 18. The generator has a rotor (not illustrated) which is driven by the engine of the motor vehicle.

The output winding of the generator is connected with the AC input terminals 20, 22 and 24 of a three-phase full wave bridge rectifier generally designated by reference number 26. This bridge rectifier is comprised of silicon diodes 28 having their cathodes connected to a positive direct voltage output terminal 30 and a plurality of silicon diodes 32 having their anodes commonly connected to the negative direct voltage output terminal 34 which is grounded. The positive direct voltage output terminal 30 is connected to a power supply conductor 36 which in turn is connected to junction 38. A pair of batteries 40 and 42 are connected in series between junction 38 and ground. The negative terminal of battery 40 is connected to the positive terminal of battery 42 by conductor 43. A junction 44 is connected to conductor 43 and therefore is connected to the positive terminal of battery 40 and the negative terminal of battery 42. In a 12–24 volt system the batteries 40 and 42 have equal rated terminal voltages of 12 volts and, as will be more fully described hereinafter, the output voltage of the generator 10 is regulated so as to provide a charging voltage between positive output terminal 30 and negative output terminal 34 of approximately 27.5 volts. This corresponds to the normal charging voltage for a so-called 24 volt system.

The system is capable of supplying both 12 volt and 24 volt electrical loads on the vehicle. For purposes of illustration the 24 volt loads are represented by resistor 46 and are energized whenever switch 48 is closed. It is seen that the 24 volt loads 46, when energized, are connected between junction 38 and ground. Examples of 24 volt loads that might be found on a motor vehicle are a 24 volt cranking motor for cranking the engine and other devices such as 24 volt direct current motors for operating blowers. Of course each load will have a separate switch for selectively energizing the respective load, which have not been illustrated.

The 12 volt loads on the motor vehicle, for convenience of illustration, are represented as resistor 50. These loads can be energized whenever a switch 54 is closed it being understood that there are separate switches to selectively energize particular 12 volt loads. The 12 volt loads include the exterior lights on the vehicle such as the head lamps and other 12 volt operated accessories on the vehicle for example radio communication equipment. Regardless of the 12 volt load it is supplied between junction 44 and ground whenever a 12 volt load is energized.

The system that has been thus far described is capable of charging the batteries 40 and 42 in series from direct voltage output terminals 30 and 34 of the bridge rectifier 26. The voltage between junction 38 and ground is maintained at a voltage of approximately 27.5 volts by a generator voltage regulator generally designated by reference numeral 56. The regulator can take various forms and can be of the type disclosed in the U.S. Pat. to Raver et al., No. 3,129,378, granted on Apr. 14, 1964. For convenience of illustration, the regulator is disclosed herein as a simplified version of the one disclosed in the Raver et al. U.S. Pat. No. 3,129,378. The regulator 56 is of the transistor type and comprises a PNP transistor 58 connected in series with field winding 12. It is seen that the series combination of the emitter and collector electrodes of transistor 58 and field winding 12 are connected between conductor 60 and ground. The conductor 60 is connected with junction 38 so that it has a potential corresponding to the voltage at the positive side of battery 40.

The conduction of transistor 58 is controlled by another PNP transistor 62 having its collector connected to the base of transistor 58. The base of transistor 62 is connected to one side of a Zener diode 64, the opposite side of which is connected to junction 66. The junction 66 is located between voltage divider resistors 68 and 70 which are series connected between conductor 60 and ground and therefore sense the voltage appearing between junction 38 and ground which is used to energize the 24 volt loads. As pointed out in the Raver et al. U.S. Pat. No. 3,129,378 the regulator has a disconnect feature which prevents current drain from the battery when the system is shut down. This feature is disclosed herein as an NPN transistor 72 having its collector and emitter circuit connected between resistor 74 and ground. The base of transistor 72 is connected with a conductor 76 which in turn is connected to junction 38 whenever a manually operable switch 78 is closed. When switch 78 is closed transistor 72 is biased conductive to connect one end of resistor 74 to ground. This is more fully explained in the above-mentioned Raver et al. U.S. Pat. No. 3,129,378 and as pointed out therein two parallel connected transistors may be used instead of one transistor 72.

When the voltage between conductor 60 and ground, which is the sensed voltage between junction 38 and ground, exceeds a predetermined value the transistor 58 is switched off due to the fact that transistor 62 is biased conductive. When the voltage drops below the desired regulated value transistor 62 switches off causing transistor 58 to turn on. The on-off switching of transistor 58 regulates the average value of the current supplied to field winding 12 with the result that the voltage appearing between conductor 38 and ground is maintained at a desired regulated value, for example 27.5 volts in a 24 volt system. The specific configuration of the voltage regulator forms no part of this invention and could take other forms as long as it is capable of regulating the field current of the generator such that a desired regulated voltage is applied between junction 38 and ground to supply the 24 volt part of the system.

As pointed out it is difficult, with only the charging system that has thus far been described to properly charge both batteries 40 and 42 since they are subjected to both 24 volt and 12 volt loads which may be unequal. In order to properly charge the batteries the present invention includes an auxiliary charging circuit for charging battery 42. This auxiliary charging circuit is connected between junction 80 and junction 44. It is seen that the junction 80 is connected to one end of phase winding 18 and is also connected to the cathode of one of the diodes 32 and the anode of one of the diodes 28. This charging circuit includes a protective overload circuit breaker 82, a choke coil or inductor 84, the anode and cathode of a silicon controlled rectifier 86 and the conductor 90. It can be seen that when controlled rectifier 86 is conductive a charging circuit can be traced from the end of phase winding 18 connected to junction 80, through circuit breaker 82, through inductor 84, through the anode-cathode circuit of controlled rectifier 86, through conductor 90 to junction 44, through battery 42 to ground and then through a diode 32 to, for example, phase winding 14 and then to the opposite side of phase winding 18. Current is only supplied through this circuit when the voltage induced in phase winding 18 is positive at its end connected to junction 80 with respect to voltage at the ends of the other phase windings. The voltage at junction 80 periodically goes negative as is known to those skilled in the art.

The controlled rectifier 86 is only gated conductive when the voltage at junction 44 is less than substantially one-half the voltage between junction 38 and ground. To this end a control circuit is provided which senses the voltage at junction 44 and a voltage which is substantially one-half the voltage appearing between conductor 38 and ground. The voltage at junction 44 is sensed by conductor 92 which is connected therewith. The voltage which represents substantially one-half system voltage is provided by a voltage divider comprised of resistors 94 and 96 and a potentiometer resistor 98. This voltage divider is connected between a conductor 100 and a grounded conductor 102. It is seen that conductor 100 is connected with junction 38 so that the voltage divider 94, 98 and 96 is connected between junction 38 and ground. The adjustable tap 104 of the voltage divider is adjusted such that its voltage equal substantially one-half the voltage appearing between junction 38 and ground.

The system operates to gate controlled rectifier 86 conductive when the voltage at junction 44 is lower than one-half system voltage which appears at tap point or junction 104. To accomplish this the system utilizes a semiconductor operational amplifier 106 connected to operate as a voltage comparator. This operational amplifier may be, for example, a Raytheon RA 4136 type which is available in a quad package. One of the four operational amplifiers of the package is used.

One of the inputs to the operational amplifier is connected to tap 104 by a resistor 108. The other input to the operational amplifier is connected to conductor 92 through a resistor 110. The resistors 108 and 110 may have equal values of approximately 4700 ohms. The direct voltage power supply to the operational amplifier is provided by conductor 112 and conductor 113 which is grounded. The conductor 112 is connected with the collector of a PNP transistor 114. The transistor 114, together with the NPN transistor 116 and resistors 118, 120 and 122 form a semiconductor switch for applying the direct voltage on conductor 100 to the positive voltage input of the operational amplifier 106 whenever switch 78 is closed. Thus, when switch 78 is closed the base-emitter circuit of transistor 116 is forward biased by the voltage applied to conductor 119 from junction 78. This biases transistor 114 fully conductive to apply the positive potential of conductor 100 to the operational amplifier 106. The purpose of this circuit is to prevent discharging of the batteries through the operational amplifier 106 when the system is in a shutdown condition.

With the connection of the operational amplifier 106, as shown in the drawing, it operates as a voltage comparator to compare the voltages of junction 44 and tap 104 and provide an output through resistor 124 to conductor 126 when the voltage at junction 44 is lower than one-half system voltage at tap 104 by a predetermined amount. In this regard, the voltage of junction 44 is applied to one input of the operational amplifier 106 and the voltage of tap 104 is applied to the other input of the operational amplifier and the amplifier compares these voltages. The output of operational amplifier 106 is applied to a light emitting diode 128 having its anode connected to conductor 126 and its cathode connected to conductor 129.

The light emitting diode is part of an optically coupled system for gating a second photo or light activated controlled rectifier 130 conductive whenever the light emitting diode 128 is energized by the output of operational amplifier 106. The photo-controlled rectifier 130 is of a type which is gated conductive when it is subjected to light energy from the light emitting diode 128. The physical arrangement of light emitting diode 128 and controlled rectifier 130 is such that light energy developed by diode 128 is applied to a part of the controlled rectifier 130 that responds to the light energy. One type of device that includes the light emitting diode and controlled rectifier in one package, which is suitable for this purpose is the General Electric H11C2 Opto-Isolator.

The anode of the light energy responsive controlled rectifier 130 is connected to junction 132 through a resistor 134. The cathode of controlled rectifier 130 is connected with the gate of controlled rectifier 86 through a conductor 136. The gate and cathode of controlled rectifier 130 is paralleled by a resistor 138. A resistor 140 and capacitor 142 are connected across the gate and cathode of controlled rectifier 86.

When the light emitting diode 128 is energized the light energy responsive controlled rectifier 130 is triggered conductive between its anode and cathode. This supplies the voltage at the junction 132 to the gate of the controlled rectifier 86 through the anode-cathode circuit of controlled rectifier 130 with the result that controlled rectifier 86 is biased conductive when the voltage at junction 132 is sufficiently positive, with respect to the voltage of junction 44.

The voltage at junction 80, which is connected to one end of phase winding 18, is an alternating voltage so that this junction goes positive and negative at the frequency of the voltage induced in the phase winding 18. The voltage wave form appearing between junction 80 and ground, when controlled rectifier 86 is conducting, is comprised of a series of spaced substantially square-wave direct voltage pulses since junction 80 periodically goes positive and negative and controlled rectifier 86 can only conduct when its anode is positive with respect to its cathode. The amplitude of these pulses is dictated by the output voltage of the generator which is controlled by voltage regulator 56. Thus, voltage pulses of a peak amplitude of approximately 27.5 volts are developed at junction 80, assuming that the voltage regulator is maintaining substantially 27.5 volts between junction 38 and ground.

The control circuit includes Zener diodes 144 and 146 connected back to back between conductors 100 and 102 and Zener diodes 148 and 150 connected back to back between conductor 92 and grounded conductor 102. The purpose of these Zener diodes is to clip transient voltages of either polarity. The Zener diodes 144 and 148 may have a break down voltage rating of 36 volts whereas the Zener diode 146 may have a voltage break down rating of 33 volts and the Zener diode 150 a voltage break down rating of 22 volts.

The capacitor 152 connected between conductors 100 and 102 and capacitor 154 connected between conductors 92 and 102 are filter capacitors and may have a capacitance, for example, of 10 microfarads. A load resistor 160 of approximately 2200 ohms is connected between conductors 92 and 102.

On a diesel powered motor coach the switch 78 may be the run-switch and switch 78 is closed when the engine of the motor vehicle is started to drive the generator 10. This biases transistor 72 conductive to set the regulator 56 into operation and also biases the transistor 114 conductive to apply direct voltage to the operational amplifier 106.

With the engine driving the generator and assuming that the voltages at junction 44 and at tap or junction 104 are substantially equal the batteries 40 and 42 are exclusively charged from the 27.5 output voltage of bridge rectifier 26 between direct voltage output terminals 30 and 34. During this mode of operation there is no gate signal to gate controlled rectifier 86 conductive so that this controlled rectifier maintains junctions 80 and 44 disconnected.

If it is assumed now that the loading condition on the system is such that the voltage of junction 44 drops a predetermined amount relative to tap 104 the operational amplifier 106 produces an output which energizes light emitting diode 128. The energization of light emitting diode 128 causes light actuated controlled rectifier 130 to conduct between anode and cathode which in turn periodically gates controlled rectifier 86 conductive. The controlled rectifier 86 now supplies charging current pulses to the junction 44. As previously mentioned, the voltage at junction 80 is an alternating voltage with the result that this voltage causes controlled rectifier 86 to be gated on and off at the frequency of the voltage at junction 80 so that periodically occurring pulses of current are supplied to junction 44 and battery 42. The controlled rectifier 86 continuously switches on and off until the voltage of junction 44 is raised to a potential substantially equal to the voltage of tap 104 which occurs when the voltage at junction 44 equals substantially one-half system voltage. The system now reverts back to a mode of operation where the output voltage of bridge rectifier 26 is the sole supply of current to series connected batteries 40 and 42. Regardless of whether controlled rectifier 86 is biased conductive the voltage regulator 56 tends to maintain a constant regulated voltage between junction 38 and ground.

The choke coil 84 may be of the air core type and have an inductance of approximately 40 microhenrys. The purpose of the inductance 84 is to prevent sudden unbalance of current generated in the phase windings 14, 16 and 18 when controlled rectifier 86 is gated conductive. The coil 84 also provides a small voltage drop in the circuit connecting junctions 80 and 44 and this voltage drop increases with the operating speed of the generator since the output frequency of the generator increases with increasing speed. In this regard the generator may have a capacity sufficient to provide current in the 100 amp range through choke 84, when controlled rectifier 86 is conducting, and the circuit breaker 82 may have an opening current rating of 105 amps.

Reference has been made herein to 12 and 24 volt systems and loads. In actual practice the open circuit voltage of the batteries will vary according to their state of charge. Moreover, although a 24 volt charging system is referred to, the two series-connected batteries are, at times, actually charged at approximately 27.5 volts as previously pointed out. The 27.5 volt charging voltage can be varied within limits and in some known systems is made variable with temperature.

Whenever the voltage at junction 44 exceeds the voltage of tap 104 there is no output from operational amplifier 106. Accordingly, controlled rectifier 86 is nonconductive. This is the same type of operation as when the voltages of junctions 44 and 104 are substantially equal. In summary, the only time controlled rectifier 86 is periodically triggered conductive is when the voltage at junction 44 is less than the voltage of tap or junction 104.

What is claimed is:

1. A motor vehicle electrical system comprising, an alternating current generator having a polyphase output winding and a field winding, a polyphase full-wave bridge rectifier having AC input terminals and direct voltage output terminals, means connecting said output winding with said AC input terminals of said bridge rectifier, positive and negative power supply conductors connected respectively with said direct voltage output terminals, first and second batteries, means connecting said batteries in series across said power supply conductors whereby said batteries can be charged at times in series by the direct voltage output of said bridge rectifier, the negative terminal of one battery connected to the positive terminal of the other battery, the connection between said batteries defining a battery junction having a voltage intermediate the voltage of said power supply conductors, voltage regulating means including voltage sensing means connected across said power supply conductors and a field current control means for controlling field current as a function of the voltage sensed by said sensing means to thereby maintain the voltage across said power supply conductors substantially constant, voltage divider means connected across said power supply conductors having a voltage divider junction that has a voltage intermediate the voltage of said power supply conductors, the ratio of voltage division provided by said voltage divider means being substantially equal to the ratio of the terminal voltage ratings of said batteries whereby said voltage divider junction and said battery junction have substantially equal voltages during certain conditions of operation of said system, a circuit connected between one phase winding of said output winding and said battery junction for at times supplying charging current to said second battery, said circuit comprising in a series connection an inductive circuit element and the anode-cathode circuit of a first controlled rectifier, a second controlled rectifier having an anode connected to said one phase winding and a cathode connected to the gate of said first controlled rectifier, said second controlled rectifier operative to gate said first controlled rectifier conductive when said second controlled rectifier is gated conductive, and means coupled to said battery and voltage divider junctions and to said second controlled rectifier for gating said second controlled rectifier conductive when the voltage at said voltage divider terminal exceeds the voltage at said battery terminal by a predetermined amount, said first controlled rectifier being nonconductive when the voltage at said battery terminal is substantially equal to or greater than the voltage of said voltage divider junction.

2. A motor vehicle electrical system comprising, an alternating current generator having a three-phase output winding and a field winding, a polyphase bridge rectifier circuit having AC input terminals connected to said output winding and direct voltage output terminals, a positive direct voltage power supply conductor connected with the positive direct voltage output terminal of said bridge rectifier, a negative power supply conductor connected to the negative direct voltage output terminal of said bridge rectifier, first and second batteries having substantially equal voltage ratings, means connecting said batteries in series with each other and across said power supply conductors, the negative terminal of one of said batteries being connected to the positive terminal of the other battery, the connection between said batteries defining a battery junction having a voltage intermediate the voltage of said power supply conductors, voltage regulating means including field current control means connected with said field winding for controlling field current, said voltage regulating means including a voltage sensing means connected across said power supply conductors and operative to control said field current control means so as to maintain a substantially constant voltage between said power supply conductors, voltage divider means having a voltage divider junction connected across said power supply conductors, said voltage divider means being so proportioned as to provide a voltage at said voltage divider junction which is substantially equal to one-half the voltage appearing across said power supply conductors, a circuit connected between one end of one of the phase windings and said battery junction for supplying current to said second battery, said circuit comprising in a series connection an inductive circuit element and the anode-cathode circuit of a first controlled rectifier, a second controlled rectifier having an anode connected to said one end of said phase winding and a cathode connected to the gate of said first controlled rectifier, said second controlled rectifier operative to gate said first controlled rectifier conductive when said second controlled rectifier is gated conductive, and means connected with said voltage divider and battery junctions and coupled to said second controlled rectifier for gating said second controlled rectifier conductive when the voltage at said voltage divider junction exceeds the voltage of said battery junction, said first controlled rectifier being nonconductive when the voltage of said battery junction substantially equals or is greater than the voltage of said voltage divider junction.

3. A motor vehicle electrical system comprising, an alternating current generator having a polyphase output winding and a field winding, a full-wave bridge rectifier having positive and negative direct voltage output terminals, positive and negative power supply conductors connected respectively with the positive and negative direct voltage output terminals of said bridge rectifier, first and second batteries having substantially equal terminal voltages, means connecting the positive terminal of said first battery to said positive power supply conductor, means connecting the negative terminal of said second battery to said negative power supply conductor, means connecting the negative terminal of said first battery to the positive terminal of said second battery whereby said batteries are connected in series across said power supply conductors, a battery junction connected to the negative terminal of said first battery and to the positive terminal of said second battery, voltage regulating means sensing the voltage across said power supply conductors and connected to said field winding for maintaining the voltage across said power supply conductors at a desired regulated value, an auxiliary charging circuit for said second battery connected between one phase winding of said output winding and said battery junction, said circuit comprising in a series connection a circuit element having inductance and the anode and cathode of a first controlled rectifier, said circuit element connected between said one phase winding and the anode of said first controlled rectifier, a second light actuated controlled rectifier having its anode connected between said circuit element and the anode of said first controlled rectifier and having its cathode connected to the gate of said first controlled rectifier, a light-emitting diode optically coupled to said light actuated controlled rectifier operative to trigger said light actuated controlled rectifier conductive when said light-emitting diode is energized, means connected across said power supply conductors for developing a reference voltage which is substantially equal to one-half the voltage appearing across said power supply conductors, an operational amplifier having an output connected to said light-emitting diode, means for applying said reference voltage to one input of said operational amplifier, and means connecting said battery junction to another input of said operational amplifier, said operational amplifier operative to energize said light-emitting diode when said reference voltage exceeds the voltage of said battery junction.

* * * * *